US009306984B2

(12) United States Patent
Choi et al.

(10) Patent No.: US 9,306,984 B2
(45) Date of Patent: Apr. 5, 2016

(54) METHOD AND SERVER FOR CONTINUOUSLY PROVIDING CONTENTS FOR MOBILE USER DEVICES BASED ON LOCATIONS THEREOF

(75) Inventors: Jung Ho Choi, Seongnam-si (KR); Jin Han Kim, Gunpo-si (KR); Young Min Chin, Seoul (KR)

(73) Assignee: KT Corporation, Seongnam (KR)

( * ) Notice: Subject to any disclaimer, the term of this patent is extended or adjusted under 35 U.S.C. 154(b) by 1251 days.

(21) Appl. No.: 13/225,065

(22) Filed: Sep. 2, 2011

(65) Prior Publication Data

US 2012/0066351 A1     Mar. 15, 2012

(30) Foreign Application Priority Data

Sep. 2, 2010    (KR) .................... 10-2010-0085954

(51) Int. Cl.
*G06F 15/16* (2006.01)
*H04L 29/06* (2006.01)

(52) U.S. Cl.
CPC ............ *H04L 65/1083* (2013.01); *H04L 65/80* (2013.01)

(58) Field of Classification Search
USPC ......................................................... 709/219
See application file for complete search history.

(56) References Cited

U.S. PATENT DOCUMENTS

| 7,529,541 | B2 * | 5/2009 | Cho et al. .................. 455/414.1 |
| 7,562,231 | B2 * | 7/2009 | Okamoto ..................... 713/193 |
| 7,647,618 | B1 * | 1/2010 | Hunter et al. ................. 725/134 |
| 7,663,048 | B2 * | 2/2010 | Kaburagi et al. .............. 84/609 |
| 8,024,762 | B2 * | 9/2011 | Britt ............................... 725/92 |
| 8,089,503 | B2 * | 1/2012 | Bruce et al. ................ 348/14.01 |
| 8,145,722 | B2 * | 3/2012 | Koons et al. ................... 709/206 |
| 8,214,870 | B2 * | 7/2012 | Mas Ivars ...................... 725/110 |
| 8,321,564 | B2 * | 11/2012 | Palm et al. ..................... 709/225 |
| 8,326,282 | B2 * | 12/2012 | Margis .......................... 455/431 |
| 8,326,967 | B2 * | 12/2012 | Sherer et al. .................. 709/224 |
| 8,516,125 | B2 * | 8/2013 | Rosenblatt et al. ........... 709/227 |
| 8,565,741 | B2 * | 10/2013 | Yang .......................... 455/414.4 |
| 8,644,683 | B2 * | 2/2014 | Shiiyama ...................... 386/278 |
| 8,667,173 | B2 * | 3/2014 | McCanne ..................... 709/238 |
| 8,745,388 | B2 * | 6/2014 | Kanungo ...................... 713/168 |
| 8,774,062 | B2 * | 7/2014 | Bahnck et al. ................ 370/270 |

(Continued)

FOREIGN PATENT DOCUMENTS

| KR | 10-0640490 B1 | 10/2006 |
| KR | 10-0664935 B1 | 12/2006 |
| KR | 10-2008-0057187 A | 6/2008 |

*Primary Examiner* — Melvin H Pollack
(74) *Attorney, Agent, or Firm* — Sughrue Mion, PLLC

(57) ABSTRACT

Provided are a continuous contents reproduction service providing server, a user device, and a method of providing a continuous contents reproduction service for continuously providing contents to a plurality of devices. The server may include: a device management unit to store identification information of a first device and a second device; a service interruption monitoring unit to determine whether reproducing of contents in the first device is interrupted; a continuous reproduction information message transceiving unit to generate a continuous reproduction information message when the reproducing of the contents is interrupted, and to transmit the generated continuous reproduction information message to the second device; a continuous reproduction management unit to receive a request for a continuous reproduction service and to determine whether to continuously provide the contents to the second device; and a contents providing unit to provide the contents to the second device based on the determination.

20 Claims, 5 Drawing Sheets

(56) References Cited

U.S. PATENT DOCUMENTS

| | | | |
|---|---|---|---|
| 8,776,106 B2* | 7/2014 | Haeuser et al. | 725/30 |
| 8,805,270 B2* | 8/2014 | Maharajh et al. | 455/3.01 |
| 8,893,177 B1* | 11/2014 | Harvey et al. | 725/38 |
| 8,909,731 B2* | 12/2014 | Takeuchi | 709/217 |
| 8,943,545 B2* | 1/2015 | Lim et al. | 725/140 |
| 8,949,914 B2* | 2/2015 | Belz et al. | 725/94 |
| 2009/0094317 A1* | 4/2009 | Venkitaraman | 709/203 |
| 2009/0307366 A1* | 12/2009 | Erb et al. | 709/231 |
| 2011/0289526 A1* | 11/2011 | Poole et al. | 725/14 |
| 2012/0064887 A1* | 3/2012 | Shobatake | 455/432.1 |
| 2012/0121233 A1* | 5/2012 | Itoh | 386/241 |
| 2012/0233644 A1* | 9/2012 | Rao | 725/62 |
| 2013/0064527 A1* | 3/2013 | Maharajh et al. | 386/343 |
| 2013/0205329 A1* | 8/2013 | Markley et al. | 725/25 |
| 2013/0232528 A1* | 9/2013 | Hiroi et al. | 725/38 |
| 2013/0298178 A1* | 11/2013 | Perlman et al. | 725/116 |
| 2014/0024340 A1* | 1/2014 | Raleigh | 455/406 |
| 2014/0157320 A1* | 6/2014 | Chang et al. | 725/46 |

\* cited by examiner

METHOD AND SERVER FOR CONTINUOUSLY PROVIDING CONTENTS FOR MOBILE USER DEVICES BASED ON LOCATIONS THEREOF

CROSS-REFERENCE TO RELATED APPLICATION

This application claims the benefit of Korean Patent Application No. 2010-0085954 filed on Sep. 2, 2010, the entire disclosures of which are incorporated herein in its entirety by reference.

BACKGROUND

1. Field

Apparatuses and methods consistent with exemplary embodiments relate to continuously providing multimedia contents among multiple user devices, and more particularly, relate to providing a user with continuous utilization of a contents service without exposing location information of a mobile device.

2. Description of Related Art

As smart phones have become more widely used and a wireless internet technology has evolved, a service for providing video contents or the like on various screens of mobile devices, set top boxes and personal computers (PCs) in the same format has been developed, and utilization of the service has been on the rise.

A multiscreen contents service provides various kinds of user devices with information, music, and video contents through wired or wireless Internet links.

A user may enjoy the same contents through various reproduction devices and may continuously enjoy the same contents using multiple reproduction devices.

Korean Patent No. 10-0640490 entitled "Multi-user support content mobility method and apparatus" (hereinafter "Patent Document 1," the disclosure of which is incorporated herein by reference) relates to a technology capable of supplying contents, from a fixed display device, continuously through a portable display device.

Although Patent Document 1 provides mobility between contents reproduction devices by interconnecting a fixed display device and a mobile display device, a redirection between reproduction devices is not made automatically.

Further, there has been disclosed, in Korean Patent No. 10-0664935 entitled "Apparatus and method for automatic redirection of multimedia contents play device" (hereinafter "Patent Document 2," the disclosure of which is incorporated herein by reference), a technology capable of automatically transmitting contents that a multimedia user has used to a multimedia contents reproduction device selected based on the user's preference while the user changes his/her position.

Although Patent Document 2 discloses that multiple contents reproduction devices are registered and when a redirection between contents reproduction devices is needed, contents are played in a new contents reproduction device based on a user's preference, location information of a device is periodically transmitted from the device to a server, so that there may be a risk of exposing location information of the user to the outside.

Thus, there is a need for a technology capable of determining whether or not it is necessary to suggest a continuous reproduction of contents by analyzing a change in position and distance between a mobile device and a fixed device using a global positioning system (GPS), and enhancing protection of personal information so as to not expose location information of the mobile device transmitted to a server.

SUMMARY

Aspects of one or more exemplary embodiments provide a server and a method for providing a continuous contents reproduction service in which a user device, and not the server, analyzes a change in position and distance between a mobile device and a fixed device, thereby determining whether or not to suggest a continuous reproduction of contents.

Further, aspects of one or more exemplary embodiments provide a server and a method of providing a continuous contents reproduction service to a user without transmitting location information of a mobile device to the server.

According to an aspect of an exemplary embodiment, there is provided a continuous contents reproduction service providing server that continuously provides contents to a plurality of devices, the server including: a device management unit configured to store identification information of a first device and identification information of a second device associated with the first device; a service interruption monitoring unit configured to determine whether a reproducing of contents is interrupted based on service interruption information received from the first device; a continuous reproduction information message transceiving unit configured to generate and transmit to the second device a continuous reproduction information message of the contents the reproducing of which is determined to be interrupted; a continuous reproduction management unit configured to receive from the second device a request for a continuous reproduction service of the contents and to determine whether or not to continuously provide the contents to the second device; and a contents providing unit configured to provide the contents to the second device based on the determination of the continuous reproduction management unit.

According to an aspect of another exemplary embodiment, there is provided a continuous contents reproduction service providing server that continuously provides contents to a plurality of devices, the server including: a device management unit configured to store identification information of a first device and identification information of a second device associated with the first device; a continuous reproduction information message transceiving unit configured to receive from the first device and transmit to the second device a continuous reproduction information message that suggests using a continuous reproduction of the contents; a continuous reproduction management unit configured to receive from the second device a request for a continuous reproduction service of the contents and determine whether or not to continuously provide the contents to the second device; and a contents providing unit configured to provide the contents to the second device in response to the request from the second device.

According to an aspect of another exemplary embodiment, there is provided a user device for providing a continuous contents reproduction service, the user device interconnected with a continuous contents reproduction service providing server, the user device including: a continuous reproduction information message receiving unit configured to receive from the continuous contents reproduction service providing server or another user device a continuous reproduction information message of contents, a reproducing of which is interrupted; a continuous reproduction determination unit configured to determine, based on a distance from the other user device, whether or not to suggest using the continuous contents reproduction service to the user if the continuous reproduction information message is received; and a contents playing unit configured to receive the contents from the continuous contents reproduction service providing server and reproduce the contents.

According to an aspect of another exemplary embodiment, there is provided a method of providing a continuous contents reproduction service in which contents are continuously provided to a plurality of devices, the method including: determining whether a reproducing of contents is interrupted based on service interruption information received from a first device; receiving location information of a second device from a continuous contents reproduction service providing server, if the reproducing of contents is interrupted; measuring a distance between the first device and the second device, and if the distance is within a predetermined range, transmitting a continuous reproduction information message to the second device, and if the reproducing of contents is not interrupted, determining whether the continuous reproduction information message is received from the second device, and if the message is received, suggesting using a continuous reproduction service to a user.

According to aspects of one or more exemplary embodiments, multimedia contents, which a user has used in a fixed device, may be automatically redirected to a mobile device and the user may continuously use the contents in the mobile device.

Further, according to aspects of one or more exemplary embodiments, a continuous contents reproduction service may be provided to a user without transmitting location information of the user's carry-on mobile device to a server through a network, and thus, a risk of exposing the location information of the user to the outside may be avoided.

BRIEF DESCRIPTION OF THE DRAWINGS

Non-limiting and non-exhaustive exemplary embodiments will be described in conjunction with the accompanying drawings. Understanding that these drawings depict only several exemplary embodiments in accordance with the disclosure and are, therefore, not to be intended to limit its scope, the disclosure will be described with specificity and detail through use of the accompanying drawings, in which.

DETAILED DESCRIPTION OF EXEMPLARY EMBODIMENTS

Figure 1:
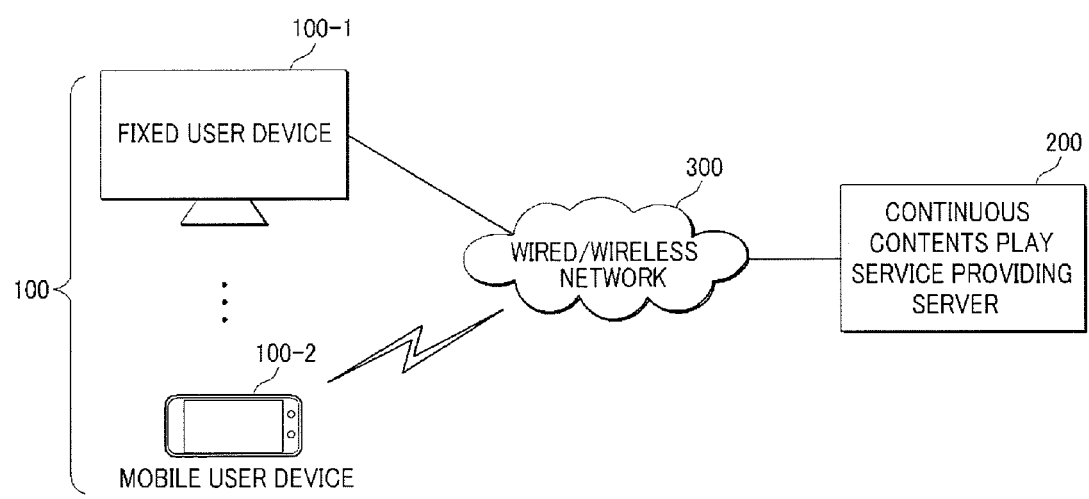
FIG. 1 is a schematic diagram of a system for providing a continuous contents reproduction service in accordance with an exemplary embodiment.

Hereinafter, exemplary embodiments will be described in detail by reference to the accompanying drawings so that exemplary embodiments may be readily implemented by those skilled in the art. However, it is to be noted that the present inventive concept is not limited to the exemplary embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements. Moreover, hereinafter, expressions such as "at least one of," when preceding a list of elements, modify the entire list of elements and do not modify the individual elements of the list.

Hereinafter, exemplary embodiments will be explained in detail with reference to the accompanying drawings.

FIG. 1 is a schematic diagram of a system for providing a continuous contents reproduction service in accordance with an exemplary embodiment.

As depicted in FIG. 1, a continuous contents reproduction service providing system in accordance with an exemplary embodiment may include a user device 100 and a continuous contents reproduction service providing server 200. The continuous contents reproduction service providing system may further include a wired/wireless network 300. The user device 100 may include a fixed user device 100-1 and a mobile user device 100-2.

The user device 100 may reproduce contents and if the reproducing of contents is interrupted, the user device 100 may generate a service closing event. Specifically, the user device 100 may be interconnected with the continuous contents reproduction service providing server 200 (to be described below), receive contents from the continuous contents reproduction service providing server 200 and reproduce the contents on a screen of user device 100. Furthermore, if the reproducing of contents is interrupted, the user device 100 may generate a service closing event and inform the continuous contents reproduction service providing server 200 of the event. In response, the user device 100 may receive a continuous reproduction information message from the continuous contents reproduction service providing server 200 and suggest using the continuous contents reproduction service to a user.

By way of example, if a reproducing of contents which have been reproduced in the fixed user device 100-1 is interrupted, the fixed user device 100-1 may generate a service closing event, and when a condition for continuously using the service is satisfied, the fixed user device 100-1 may transmit a continuous reproduction information message with a destination of the mobile user device 100-2 to the continuous contents reproduction service providing server 200.

Further, if contents which have been reproduced in the user device 100 are to be continuously reproduced in another user device 100, the user device 100 may issue a continuous reproduction information message with a destination of the other user device 100 and transmit the issued message to the continuous contents reproduction service providing server 200.

The user device 100 may be a fixed user device 100-1 or a mobile user device 100-2. By way of example, the fixed user device 100-1 may be fixed while being used and may include a communication device such as a set top box (STB), a smart TV, a PC, an internet phone or the like, and the mobile user device 100-2 may include a mobile communication device such as a mobile phone, a smart phone, a portable PC, a mobile internet device (MID), a portable multimedia player (PMP), etc. A detailed configuration of a user device 100 according to an exemplary embodiment is provided below with reference to FIG. 2.

The continuous contents reproduction service providing server 200 may provide contents to the user devices 100, manage multiple user devices 100 used by a user, and transmit a continuous reproduction information message from a user device to another destination user device.

Specifically, the continuous contents reproduction service providing server 200 may register and manage information of multiple user devices 100-1 and 100-2 registered by the user, and monitor whether a service in a user device 100 is interrupted. Furthermore, if a service closing event is generated in a certain user device, the continuous contents reproduction service providing server 200 may provide the continuous contents reproduction service to another registered user device. Further, if the user device 100 transmits a continuous play information message with a destination of another user device, the continuous contents reproduction service providing server 200 may relay the corresponding continuous reproduction information message to the other user device. A detailed configuration of a continuous contents reproduction service providing server 200 according to an exemplary embodiment will be provided below with reference to FIG. 3.

The wired/wireless network 300 may provide a communication route between the continuous contents reproduction service providing server 200 and the user device 100. The continuous contents reproduction service providing server 200 and the user device 100 may be connected and communicated with the wired/wireless network 300 via a wired network or a wireless network.

The wired/wireless network 300 may include a dedicated line, a local area network (LAN), a QAN, a virtual area network (VAN), an intranet, a private telephone network, a public telephone network and any combination thereof. Moreover, the wired/wireless network 300 may serve as a data communications network enabling communications between the continuous contents reproduction service providing server 200 and the user device 100, and may include a wired internet, a wireless internet, a mobile wireless communications network, and any combination thereof.

Hereinafter, a detailed configuration of a user device for providing a continuous contents reproduction service in accordance with an exemplary embodiment will be explained with reference to FIG. 2.

Figure 2:
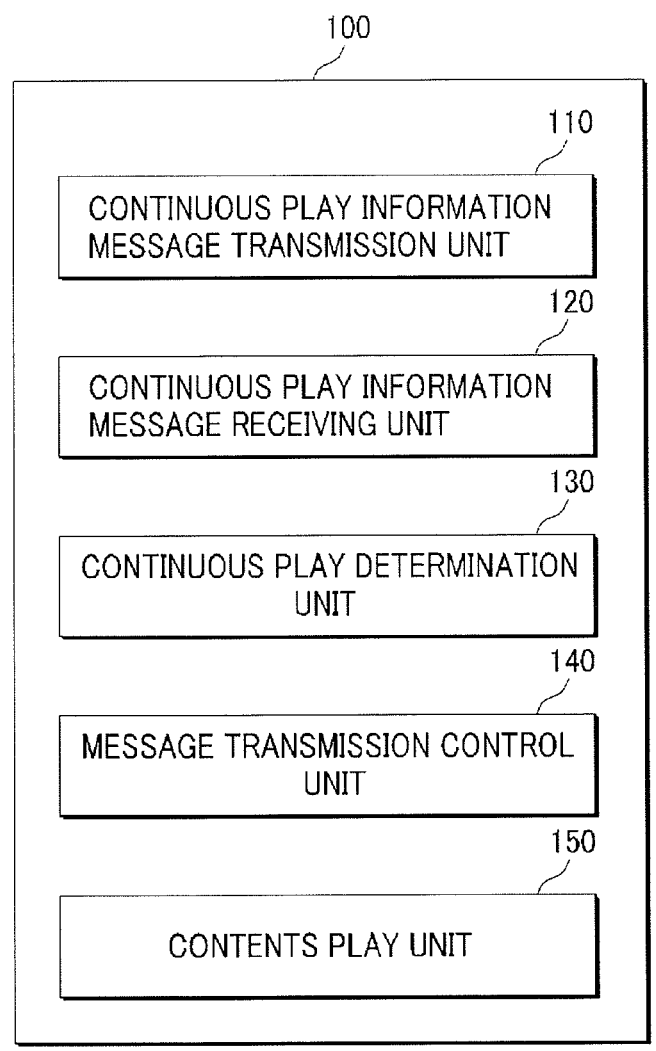
FIG. 2 is a detailed configuration view of a user device for providing a continuous contents reproduction service in accordance with an exemplary embodiment.

FIG. 2 is a detailed configuration view of a user device 100 for providing a continuous contents reproduction service in accordance with an exemplary embodiment.

As depicted in FIG. 2, the user device 100 may be interconnected with a continuous contents reproduction service providing server 200 to provide a continuous contents reproduction service, and the user device 100 may include a continuous reproduction information message transmission unit 110, a continuous reproduction information message receiving unit 120, a continuous reproduction determination unit 130, a message transmission control unit 140, and a contents reproduction unit 150. The user device 100 may further include an event detection unit (not illustrated).

The continuous reproduction information message transmission unit 110 may be configured to transmit a continuous reproduction information message to another user device. Specifically, the continuous reproduction information message transmission unit 110 may transmit a continuous reproduction information message to another user device or to the continuous contents reproduction service providing server 200.

The continuous reproduction information message receiving unit 120 may be configured to receive the continuous reproduction information message from another user device or from the continuous contents reproduction service providing server 200.

Further, the continuous reproduction information message receiving unit 120 may check whether a message database (DB) 250 of the continuous contents reproduction service providing server 200 to be described below includes the continuous reproduction information message. If the continuous reproduction information message is included therein, the continuous reproduction information message receiving unit 120 may receive the continuous reproduction information message through a continuous reproduction information message transceiving unit of the continuous contents reproduction service providing server 200 to be described below.

The continuous reproduction determination unit 130 may be configured to determine whether or not to suggest using the continuous contents reproduction service to the user, if the continuous reproduction information message is received from the continuous contents reproduction service providing server 200.

Specifically, the continuous reproduction determination unit 130 may be interconnected with the continuous reproduction information message receiving unit 120, and may determine whether the continuous reproduction information message contained in the message DB 250 of the continuous contents reproduction service providing server 200 to be described below is valid. If the continuous reproduction information message is valid, the user device 100 may receive the continuous reproduction information message through the continuous reproduction information message receiving unit 120.

Further, the continuous reproduction determination unit 130 may suggest, to the user, whether or not to use the continuous contents reproduction service based on the received continuous reproduction information message.

In the case of a mobile user device 100-2, if a continuous reproduction information message is received from a fixed user device 100-1, the continuous reproduction determination unit 130 may calculate a distance between the fixed user device 100-1 and the mobile user device 100-2 by using location information thereof, and may suggest using the continuous contents reproduction service to the user if the two devices are distanced by a certain distance or greater from each other. Further, regardless of a distance between the two devices, the continuous reproduction determination unit 130 may be configured to suggest using the continuous contents reproduction service whenever receiving the continuous reproduction information message from the fixed user device 100-1.

The location of the mobile user device 100-2 may be measured by using a GPS, a wireless access point (AP), base station information, etc., and the most accurate measurement method thereamong may be preferentially used. The measured location information of the mobile user device 100-2 may be used in the mobile user device 100-2 only for measuring a distance from the fixed user device 100-1 without being transmitted to the outside.

In the case of a fixed user device 100-1, if receiving the continuous reproduction information message from a mobile user device 100-2, the continuous reproduction determination unit 130 may suggest using the continuous contents reproduction service regardless of a distance between the two devices.

The message transmission control unit 140 may be configured to determine whether or not to transmit the continuous reproduction information message, if a service closing event is generated in the user device 100.

In the case of a mobile user device 100-2, the message transmission control unit 140 may generate measuring location information of the mobile user device 100-2 when the service closing event is generated, and may calculate a distance between the mobile user device 100-2 and a fixed user device 100-1 for a predetermined period of time. If the two devices are within a certain distance from each other, the message transmission control unit 140 may transmit the continuous reproduction information message to the corresponding fixed user device 100-1. The message transmission control unit 140 may be configured to transmit the continuous reproduction information message to the fixed user device 100-1 regardless of a distance between the two devices whenever the service closing event is generated.

In the case of a fixed user device 100-1, the message transmission control unit 140 may transmit the continuous reproduction information message to a mobile user device 100-2 regardless of a measured distance whenever the service closing event is generated in the fixed user device 100-1.

The contents reproduction unit 150 may be configured to receive contents from the continuous contents reproduction service providing server 200 and reproduce the contents in the user device 100. If the user accepts the suggestion of using the continuous contents reproduction service, the contents reproduction unit 150 may reproduce the next part of the contents reproduced in another user device 100.

The event detection unit (not illustrated) may be configured to inform the message transmission control unit 140 of an event, when the reproducing of contents is interrupted and the service closing event is generated.

If the service closing event is generated in the fixed user device 100-1, the continuous reproduction information message may be transmitted to the mobile user device 100-2 directly or via the continuous contents reproduction service providing server 200, and if the service closing event is generated in the mobile user device 100-2, the continuous reproduction information message may be transmitted to the fixed user device 100-1 directly or via the continuous contents reproduction service providing server 200.

Hereinafter, a detailed configuration of a continuous contents reproduction service providing server in accordance with an exemplary embodiment will be explained with reference to FIG. 3.

Figure 3:
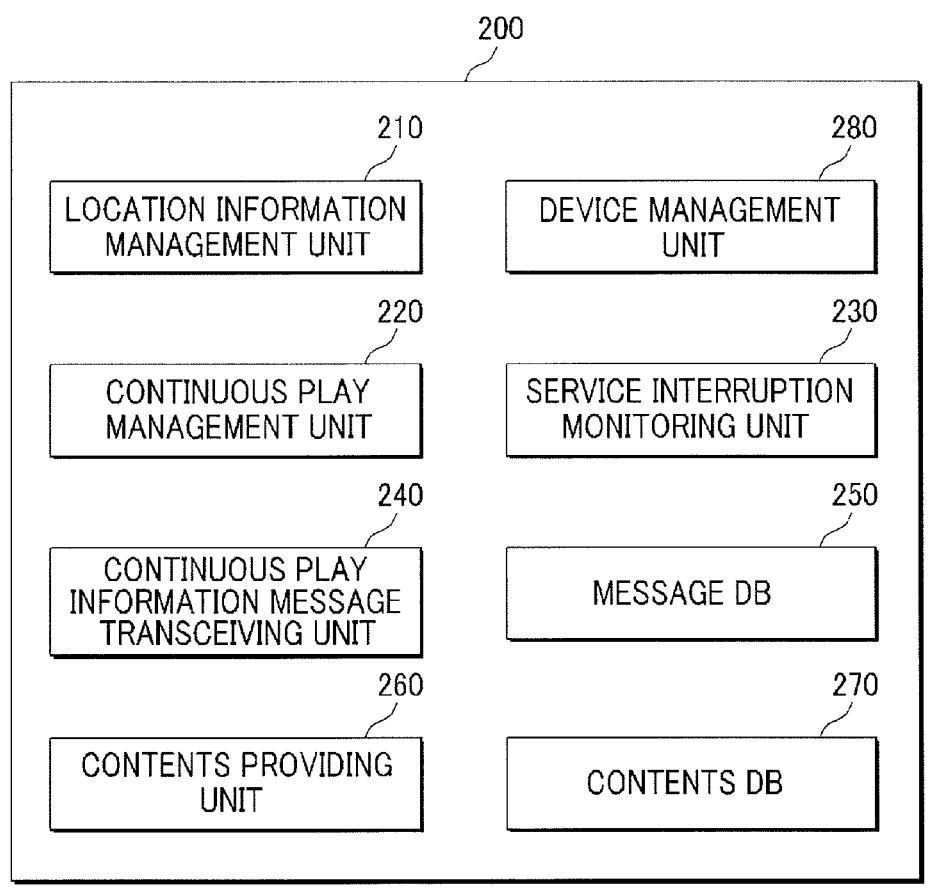
FIG. 3 is a detailed configuration view of a continuous contents reproduction service providing server for providing a continuous contents reproduction service in accordance with an exemplary embodiment.

FIG. 3 is a detailed configuration view of a continuous contents reproduction service providing server 200 for providing a continuous contents reproduction service in accordance with an exemplary embodiment.

As depicted in FIG. 3, the continuous contents reproduction service providing server 200 may include a location information management unit 210, a continuous reproduction management unit 220, a service interruption monitoring unit 230, a continuous reproduction information message transceiving unit 240, and a device management unit 280. The continuous contents reproduction service providing server 200 may further include a message DB 250, a contents providing unit 260, and a contents DB 270.

The location information management unit 210 may be configured to manage location information of a fixed user device 100-1. Specifically, the location information management unit 210 may receive location information directly from the fixed user device 100-1 or may receive and manage location measurement information for obtaining location information, and if a request for providing location information of the fixed user device 100-1 is received from a mobile user device 100-2, the location information management unit 210 may provide the location information of the fixed user device 100-1 to the mobile user device 100-2.

By way of example, if the fixed user device 100-1 is turned on, location measurement information of the fixed user device 100-1, such as an IP address or the like, may be registered at the location information management unit 210 of the continuous contents reproduction service providing server 200, and the location information management unit 210 may obtain the location information of the fixed user device 100-1 by using the registered location measurement information.

The location information management unit 210 may find a location of a corresponding fixed user device 100-1 by using the received location measurement information. The location measurement information may include information of a subscriber and network information such as an IP address of the fixed user device 100-1. Further, the location information management unit 210 may manage information of multiple devices for each user.

The location information management unit 210 may be implemented in the continuous contents reproduction service providing server 200 and/or may be configured as a separate location information management server.

The continuous reproduction management unit 220 may be configured to perform user authentication for continuously using contents. To be specific, the continuous reproduction management unit 220 may receive a request for continuously using contents, and may determine where a reproducing of contents is interrupted by searching a history of reproduction of the contents.

The continuous reproduction management unit 220 may check whether a user device 100 corresponding to a destination of a continuous reproduction information message transmitted from another user device 100 is registered in a name of the user, and restrict access to the continuous contents reproduction if the device 100 is not registered in the name of the user.

Further, the continuous reproduction management unit 220 may determine whether the user device 100 corresponding to the destination can reproduce the contents, and restrict access to the continuous contents reproduction if the device cannot reproduce the contents.

The continuous reproduction management unit 220 may be implemented in the continuous contents reproduction service providing server 200 and/or may be configured as a separate continuous reproduction authentication server.

The service interruption monitoring unit 230 may be configured to monitor whether a contents reproduction service is interrupted in a user device 100. Specifically, if a reproducing of contents is interrupted in a mobile user device 100-2, the service interruption monitoring unit 230 may detect that the reproducing of contents is interrupted, and may generate and transmit a continuous reproduction information message to another user device (e.g., a fixed user device 100-1).

Even if the reproducing of contents is interrupted in the fixed user device 100-1, the service interruption monitoring unit 230 may detect that the reproducing of contents is interrupted, and may generate and transmit a continuous reproduction information message to another user device (e.g., a mobile user device 100-2).

The service interruption monitoring unit 230 may detect that a reproducing of contents is interrupted in a user device

100 by monitoring at least one of log information and a streaming status of the contents provided to user device 100. Moreover, the service interruption monitoring unit 230 may be configured to be informed by the user device 100 that the reproducing of contents is interrupted.

The continuous reproduction information message transceiving unit 240 may be configured to transmit and receive a continuous reproduction information message by communicating with a user device 100. Specifically, the continuous reproduction information message transceiving unit 240 may receive a continuous reproduction information message by communicating with the continuous reproduction information message transmission unit 110 and the continuous reproduction information message receiving unit 120 of the user device (e.g., a fixed user device 100-1 or a mobile user device 100-2), and may generate and transmit to the user device (e.g., the fixed user device 100-1) a continuous reproduction information message of contents, the reproduction of which is determined as being interrupted based on service interruption information.

If a continuous reproduction information message is received from a fixed user device 100-1, the continuous reproduction information message transceiving unit 240 may transmit the message to a mobile user device 100-2 serving as a destination, and if a continuous reproduction information message is received from the mobile user device 100-2, the continuous reproduction information message transceiving unit 240 may transmit the message to the fixed user device 100-1.

If multiple fixed user devices 100-1 are registered in the name of the user, the continuous reproduction determination unit 130 of the mobile user device 100-2 may transmit a continuous reproduction information message to a fixed user device 100-1 determined based on location information and a distance between the devices.

Further, the continuous reproduction information message transceiving unit 240 may periodically check the message DB 250, and may determine whether a continuous reproduction information message requested to be transmitted exists.

The continuous reproduction information message transceiving unit 240 may be implemented in the continuous contents reproduction service providing server 200 and/or may be configured as a separate continuous reproduction information message transceiving server.

The message DB 250 may be configured to store continuous reproduction information messages received from one or more user devices 100. The message DB 250 may temporarily store the received continuous reproduction information messages, periodically check the stored continuous reproduction information messages, and delete an invalid continuous reproduction information message.

The message DB 250 may be implemented in the continuous contents reproduction service providing server 200 and/or may be configured as a separate message DB server.

The contents providing unit 260 may be configured to provide a user device 100 with contents requested by the user device 100. Specifically, the contents providing unit 260 may receive a request for providing contents from a fixed user device 100-1 or a mobile user device 100-2, check a request authority for the corresponding contents, and provide the corresponding contents to the user through the user device 100 which requests the contents if the user has an authority for the corresponding contents. Further, the contents providing unit 260 may provide the requested contents to the user device 100 which requests the contents based on the determination of the continuous reproduction management unit 220.

If a reproducing of the contents is interrupted in a user device 100, the contents providing unit 260 may store information of a point where the contents are reproduced, and when another user device requests to reproduce the contents thereafter, may provide the contents by using a contents view log of the user, so that the contents are replayed from the point where the reproducing of contents is interrupted. Further, the contents providing unit 260 may provide contents from a point requested by the user device 100.

The contents providing unit 260 may convert contents into various formats based on the type of a user device and provide the converted contents.

The contents providing unit 260 may be implemented in the continuous contents reproduction service providing server 200 and/or may be configured as a separate contents server.

The contents DB 270 may be configured to store contents to be provided to the user. The contents DB 270 may store the contents converted into various formats based on the type of the user device 100. Further, the contents DB 270 may be provided in the continuous contents reproduction service providing server 200 or may be configured as a separate contents DB server. Furthermore, the contents DB 270 and the contents providing unit 260 may be configured as a separate contents providing server.

The device management unit 280 may be configured to manage identification information of a user device. Specifically, the device management unit 280 may manage identification information of one or more user devices (e.g., a fixed user device 100-1 and a mobile user device 100-2) registered in the name of the user and information related to the registered user devices.

Hereinafter, a process for providing a continuous contents reproduction service in a continuous contents reproduction service providing server in accordance with an exemplary embodiment will be explained with reference to FIG. 4.

Figure 4:
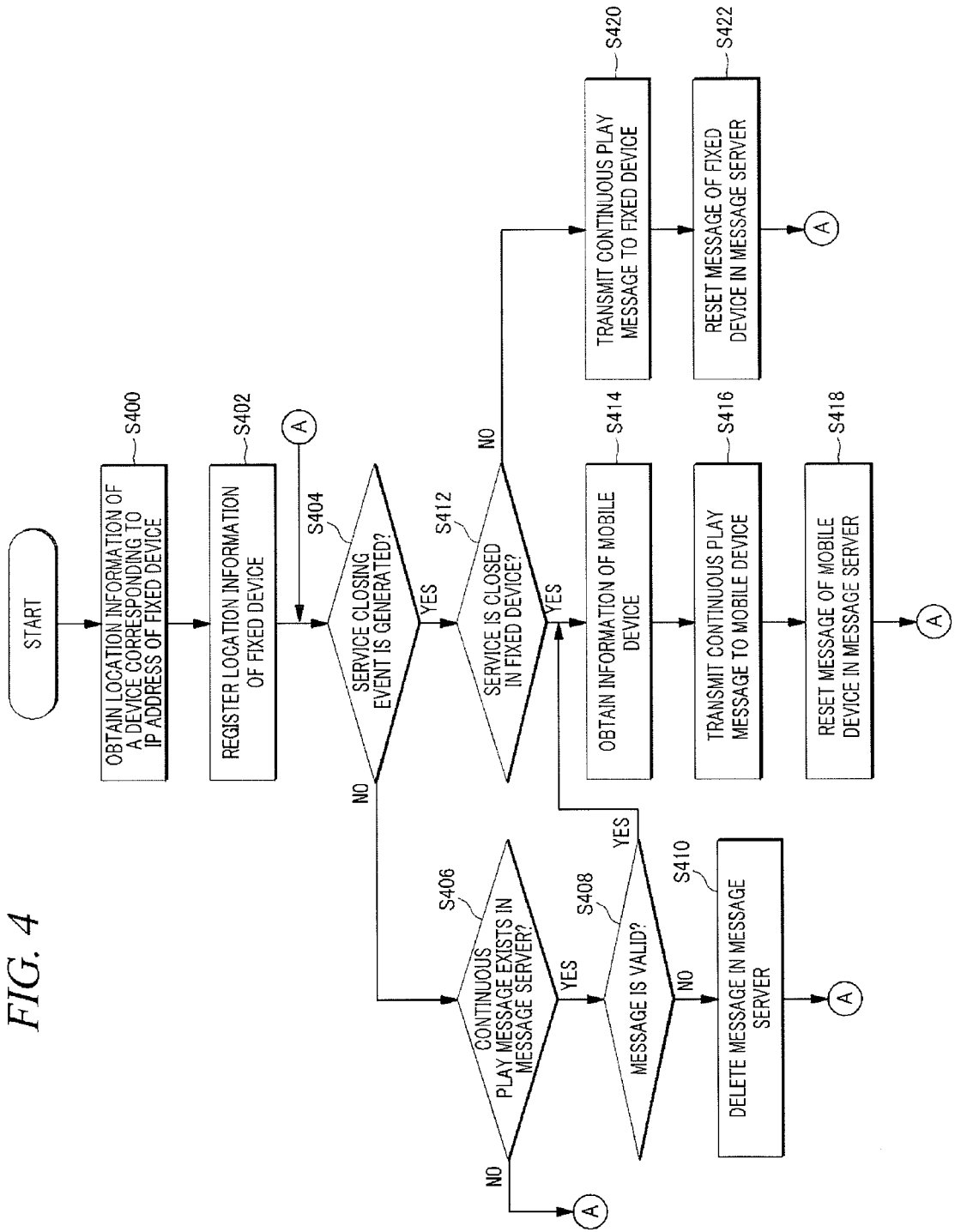
FIG. 4 is a flowchart for explaining a process in a continuous contents reproduction service providing server in accordance with an exemplary embodiment.

FIG. 4 is a flowchart for explaining a process in a continuous contents reproduction service providing server 200 in accordance with an exemplary embodiment.

As depicted in FIG. 4, location measurement information of a fixed user device 100-1, such as an IP address of the fixed user device 100-1 transmitted at the time of starting a process, etc., may be received, and location information of the fixed user device 100-1 may be obtained based on the received location measurement information such as the IP address, etc. (operation S400). Thereafter, the obtained location information of the fixed user device 100-1 may be registered (operation S402).

Thereafter, the continuous contents reproduction service providing server 200 may check whether a reproducing of contents is interrupted in a user device 100, and if the reproducing of contents is interrupted (operation S404), the continuous contents reproduction service providing server 200 may determine whether the user device in which the reproducing of contents is interrupted is a fixed user device 100-1 or a mobile user device 100-2 (operation S412).

If the reproducing of contents is interrupted in the fixed user device 100-1, information of the mobile user device 100-2 may be obtained by using information of user devices registered by the user (operation S414), and a continuous reproduction information message may be transmitted to the mobile user device 100-2 (operation S416). In such cases, the transmitted continuous reproduction information message may be transmitted from the fixed user device 100-1 in which the reproducing of contents is interrupted, or may be generated from the continuous contents reproduction service providing server 200 right after the reproducing of contents is interrupted. Further, after the continuous reproduction information message is transmitted to the mobile user device 100-2, the corresponding continuous reproduction information message may be deleted from the message DB 250 (operation S418).

If the reproducing of contents is interrupted in the mobile user device 100-2, a continuous reproduction information message may be transmitted to a specific fixed user device 100-1 determined by the mobile user device 100-2 by using information such as a distance between the devices (operation S420). In such cases, the transmitted continuous reproduction information message may be transmitted from the mobile user device 100-2 in which the reproducing of contents is interrupted, or may be generated from the continuous contents reproduction service providing server 200 right after the reproducing of contents is interrupted. Further, after the continuous reproduction information message is transmitted to the fixed user device 100-1, the corresponding continuous reproduction information message may be deleted from message DB 250 (operation S422).

If the reproducing of contents is not interrupted, the message DB 250 may determine whether the continuous reproduction information message is received (operation S406), and if the continuous reproduction information message is received, the message DB 250 may determine whether the received message is valid (operation S408).

If the continuous reproduction information message is valid, the continuous reproduction information message may be transmitted to a user device 100 serving as a destination of the continuous reproduction information message (operation S416). After the continuous reproduction information message is transmitted to the user device 100, the corresponding continuous reproduction information message may be deleted from message DB 250 (operation S418).

In such cases, if the continuous reproduction information message is received from a mobile user device 100-2, the corresponding continuous reproduction information message may be transmitted to a fixed user device 100-1, and if the continuous reproduction information message is received from the fixed user device 100-1, the continuous reproduction information message may be transmitted to the mobile user device 100-2.

Hereinafter, a process in a mobile user device 100-2 will be explained as an example of a method for providing a continuous contents reproduction service in accordance with an exemplary embodiment with reference to FIG. 5.

Figure 5:
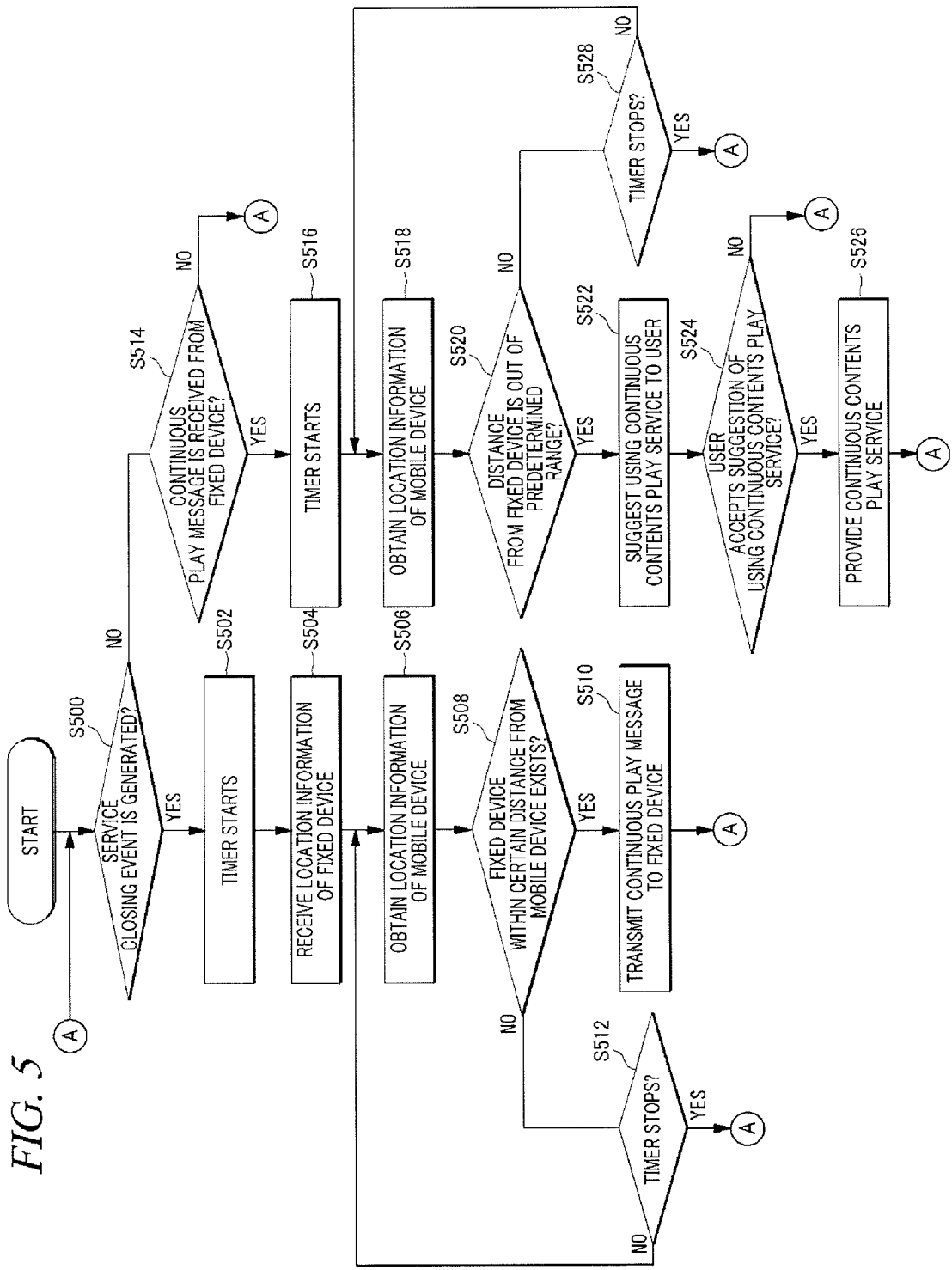
FIG. 5 is a flowchart for explaining a process in a mobile user device for providing a continuous contents reproduction service in accordance with an exemplary embodiment.

FIG. 5 is a flowchart for explaining a process in a mobile user device 100-2 for providing a continuous contents reproduction service in accordance with an exemplary embodiment.

As depicted in FIG. 5, it may be determined whether a reproducing of contents is interrupted in the mobile user device 100-2 (operation S500).

If the reproducing of contents is interrupted and a service closing event is generated in the mobile user device 100-2, a timer may start for a predetermined time (operation S502), and location information of a fixed user device 100-2 may be received from a continuous contents reproduction service providing server 200 (operation S504).

Thereafter, location information of the mobile user device 100-2 may be measured (operation S506), and it may be determined whether there is a fixed user device 100-1 available within a certain distance from the mobile user device 100-2 (operation S508). If there is a fixed user device 100-1 satisfying this condition, a continuous reproduction information message may be transmitted to the corresponding fixed user device 100-1 (operation S510). If there is no fixed user device 100-1 satisfying this condition, operation S506 and S508 may be repeated until the timer stops (operation S512).

If the service closing event is not generated, it may be checked whether a continuous reproduction information message is received from a fixed user device 100-1 (operation S514).

If there is a received message, the timer may start for a predetermined time (operation S516), and location information of the fixed user device 100-1 may be received from the continuous contents reproduction service providing server 200, and location information of the mobile user device 100-2 may be measured (operation S518).

If the fixed user device 100-1 and the mobile user device 100-2 are distanced by a certain distance or greater from each other (operation S520), the mobile user device 100-2 may display, on its screen, a suggestion of using the continuous contents reproduction service to the user (operation S522). If the user accepts the suggestion (operation S524), the mobile user device 100-2 may request to continuously provide the contents to the continuous contents reproduction service providing server 200 (operation S526). In such cases, the mobile user device 100-2 may be configured to suggest using the continuous contents reproduction service to the user without comparing a distance from the fixed user device 100-1.

As described above, even if location information of a mobile user device of a user is not transmitted to a continuous contents reproduction service providing server, it may be possible to suggest to the user whether or not to continuously use contents by measuring a distance between the mobile user device and a fixed user device, and thus, it may be possible to protect location information of the user.

Exemplary embodiments may be embodied in a storage medium including instruction codes executable by a computer such as a program module executed by the computer. Moreover, a data structure in accordance with an exemplary embodiment may be stored in a storage medium executable by the computer. A computer readable medium can be any usable medium which can be accessed by the computer and includes any volatile and non-volatile media and any removable and non-removable media. Further, the computer readable medium may include any computer storage and communication media. The computer storage medium includes any volatile and non-volatile media and any removable and non-removable media embodied by a certain method or technology for storing information such as computer readable instruction code, a data structure, a program module or other data. The communication medium may include the computer readable instruction code, the data structure, the program module, or other data of a modulated data signal such as a carrier wave, or other transmission mechanism, and includes a certain information transmission medium. Moreover, one or more units of the above-described devices and servers can include a processor or microprocessor executing a computer program stored in a computer-readable medium.

The above description is provided for the purpose of illustration, and it is understood by those skilled in the art that various changes and modifications may be made without departing from the present inventive concept. Thus, it is clear that the above-described exemplary embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of exemplary embodiments. It shall be understood that all modifications and exemplary embodiments conceived from the meaning and scope of the claims and their equivalents are included in the scope of the present disclosure.

What is claimed is:

1. A continuous contents reproduction service providing server for continuously providing contents to a plurality of devices, the continuous contents reproduction service providing server comprising:
   a device manager configured to store identification information of a first device, among the plurality of devices, and identification information of a second device, among the plurality of devices, associated with the first device;
   a processor having a service interruption monitoring unit configured to determine whether a reproducing of contents in the first device is interrupted based on service interruption information received from the first device;
   a continuous reproduction information message transceiver configured to, in response to the service interruption monitoring unit determining that the reproducing of contents in the first device is interrupted, determine the second device as another device to which continuous reproduction of the contents is to be suggested and as associated with the first device from the identification information of the second device previously stored by the device manager, generate a continuous reproduction information message of the contents when the service interruption monitoring unit determines that the reproducing of the contents is interrupted, and transmit the generated continuous reproduction information message to the second device determined as another device to which continuous reproduction of the contents is to be suggested and as associated with the first device;
   a continuous reproduction manager configured to receive, from the second device in response to the transmitted continuous reproduction information message, a request for a continuous reproduction service of the contents and to determine, in response to the received request, whether to continuously provide the contents to the second device; and
   a contents provider configured to provide the contents to the second device based on the determination of the continuous reproduction manager.

2. The continuous contents reproduction service providing server of claim 1, wherein the continuous reproduction manager is configured to receive the request for a continuous reproduction service of the contents and determine a point where the reproducing of the contents is interrupted by searching a history of reproducing the contents.

3. The continuous contents reproduction service providing server of claim 2, wherein the contents provider is configured to provide the contents from the point where the reproducing of the contents is interrupted.

4. The continuous contents reproduction service providing server of claim 1, wherein the contents provider is configured to provide the contents from a reproduction point requested by the second device.

5. The continuous contents reproduction service providing server of claim 1, wherein the second device is associated with a user of the first device.

6. The continuous contents reproduction service providing server of claim 1, wherein the first device is one of a mobile device and a fixed device, and the second device is the other of the mobile device and the fixed device.

7. A continuous contents reproduction service providing server for continuously providing contents to a plurality of devices, the continuous contents reproduction service providing server comprising:
   a device manager configured to store identification information of a first device, among the plurality of devices, and identification information of a second device, among the plurality of devices, associated with the first device;
   a continuous reproduction information message transceiver configured to receive, from the first device in which the contents are being reproduced, a continuous reproduction information message that suggests using a continuous reproduction of the contents, and to transmit, to the second device, the continuous reproduction information message;
   a processor having a continuous reproduction manager configured to receive, from the second device, a request for a continuous reproduction service of the contents and to determine whether to continuously provide the contents to the second device; and
   a contents provider configured to provide the contents to the second device in response to the request from the second device according to the determination of the continuous reproduction manager.

8. The continuous contents reproduction service providing server of claim 7, wherein the continuous reproduction information message generated by the first device comprises information indicating the second device as a destination device if a reproducing of the contents is interrupted in the first device.

9. The continuous contents reproduction service providing server of claim 7, wherein the continuous reproduction information message generated by the first device comprises information indicating the second device as a destination device.

10. A user device for providing a continuous contents reproduction service, the user device comprising:
    a continuous reproduction information message receiving unit configured to receive, from a continuous contents reproduction service providing server or another user device, a first continuous reproduction information message of contents, a reproducing of which is interrupted in the other user device;
    a processor having a continuous reproduction determiner configured to determine, based on a distance of the user device to the other user device, whether to suggest using the continuous contents reproduction service, in which the reproducing of the contents is transferred from the other user device to the user device, to the user if the first continuous reproduction information message is received; and
    a contents playing unit configured to receive the contents from the continuous contents reproduction service providing server and to reproduce the contents,
    wherein the distance of the user device to the other user device is determined by the user device.

11. The user device of claim 10, further comprising:
    a message transmission control unit configured to determine, based on the distance to the other user device, which of the other user device and the continuous contents reproduction service providing server to transmit a second continuous reproduction information message if reproducing of contents is interrupted in the user device; and
    a continuous reproduction information message transmission unit configured to transmit the second continuous reproduction information message to one of the other user device and the continuous contents reproduction service providing server based on a result of the determination by the message transmission control unit.

12. A method of providing a continuous contents reproduction service in which contents are continuously provided to a plurality of devices, the method comprising:
determining whether a reproducing of contents is interrupted in a first device, among the plurality of devices;
receiving location information of a second device, among the plurality of devices, from a continuous contents reproduction service providing server;
if the reproducing of contents is interrupted according to the determining, measuring, by the first device, a distance between the first device and the second device, and if the distance is within a predetermined range according to the measuring, transmitting a first continuous reproduction information message to the second device; and
if the determining does not determine that the reproducing of contents is interrupted, determining whether a second continuous reproduction information message is received from the second device, and if the message is received from the second device, suggesting using the continuous contents reproduction service to a user,
wherein the contents are provided from a server distinct from the first device and the second device.

13. The method of claim 12, wherein the first device is one of a mobile device and a fixed device, and the second device is the other of the mobile device and the fixed device.

14. The method of claim 13, wherein the transmitting the first continuous reproduction information message to the second device comprises:
obtaining, from the first device, location information of the first device;
measuring the distance between the first device and the second device based on the location information of the first device and the location information of the second device; and
if the distance between the first device and the second device is within a predetermined range according to the measuring, transmitting the first continuous reproduction information message to the second device.

15. The method of claim 13, wherein the suggesting using the continuous contents reproduction service to the user comprises:
determining whether the second continuous reproduction information message is received from the second device;
obtaining, from the first device, location information of the first device;
measuring the distance between the first device and the second device based on the location information of the first device and the location information of the second device; and
if the distance between the two devices is not within a predetermined range according to the measuring, displaying a suggestion of using the continuous contents reproduction service on a screen of the first device.

16. A method of providing a continuous contents reproduction service in which contents are continuously provided to a plurality of devices, the method comprising:
receiving, by a user device from another user device, a continuous reproduction information message of contents, a reproducing of which is interrupted in the other user device;
determining, by the user device, a distance from the user device to the other user device; and
receiving the contents from a continuous contents reproduction service providing server if the determined distance to the other user device is greater than a predetermined distance.

17. A non-transitory computer readable recording medium having recorded thereon a program executable by a computer for performing the method of claim 12.

18. A non-transitory computer readable recording medium having recorded thereon a program executable by a computer for performing the method of claim 16.

19. The continuous contents reproduction service providing server of claim 7, wherein the continuous reproduction information message transceiver is configured to, in response to the received continuous reproduction information message, determine the second device as another device associated with the first device from the identification information of the second device previously stored by the device manager.

20. The user device of claim 10, wherein the continuous reproduction determiner is configured to determine to suggest using the continuous contents reproduction service if the distance from the user device to the other user device is greater than a predetermined amount.

* * * * *